(12) United States Patent
Mellon et al.

(10) Patent No.: US 12,730,125 B2
(45) Date of Patent: Sep. 8, 2026

(54) WHEEL SPEED TRANSDUCER TEST ADAPTER

(71) Applicant: The Boeing Company, Arlington, VA (US)

(72) Inventors: Matthew Norris Mellon, Payson, IL (US); Joseph Edward Flach, St. Charles, MO (US)

(73) Assignee: The Boeing Company, Arlington, VA (US)

(*) Notice: Subject to any disclaimer, the term of this patent is extended or adjusted under 35 U.S.C. 154(b) by 427 days.

(21) Appl. No.: 18/334,831

(22) Filed: Jun. 14, 2023

(65) Prior Publication Data

US 2024/0418745 A1 Dec. 19, 2024

(51) Int. Cl.

| | |
|---|---|
| ***G01P 21/02*** | (2006.01) |
| ***B64F 5/60*** | (2017.01) |
| ***G01P 21/00*** | (2006.01) |

(52) U.S. Cl.

CPC ................ *G01P 21/00* (2013.01); *B64F 5/60* (2017.01); *G01P 21/02* (2013.01)

(58) Field of Classification Search

CPC . G01P 21/00; G01P 21/02; B64F 5/60; G01B 21/02

USPC .................................... 73/1.37, 493; 403/79

See application file for complete search history.

(56) References Cited

U.S. PATENT DOCUMENTS

| | | | | |
|---|---|---|---|---|
| 3,739,077 A * | 6/1973 | Winkelman | ............. | H02G 7/12 174/149 R |
| 2010/0038903 A1* | 2/2010 | Linhorst | ................. | F16L 33/12 285/365 |

FOREIGN PATENT DOCUMENTS

| | | | |
|---|---|---|---|
| CN | 202477622 U * | 10/2012 | |
| CN | 103803098 * | 5/2014 | |
| CN | 111002045 A * | 4/2020 | |
| CN | 210374582 U * | 4/2020 | |
| DE | 102016224761 A1 * | 6/2017 | ......... B22D 11/1287 |

* cited by examiner

*Primary Examiner* — Robert R Raevis

(74) *Attorney, Agent, or Firm* — Yee & Associates, P.C.

(57) ABSTRACT

A wheel speed transducer test adapter and method for wheel speed transducer testing. The wheel speed transducer test adapter includes a socket for engagement with a wheel hub. A clevis is rotatable within the socket and with respect to the socket and the wheel hub. The clevis is engaged with a wheel speed transducer attached to the wheel hub. A collar secures the clevis to the socket. A torque supplying device rotates the clevis at a consistent speed which in turn rotates the wheel speed transducer to test the wheel speed transducer after repair or replacement. The entire assembly ensures stability and alignment while the clevis and wheel speed transducer rotate.

20 Claims, 12 Drawing Sheets

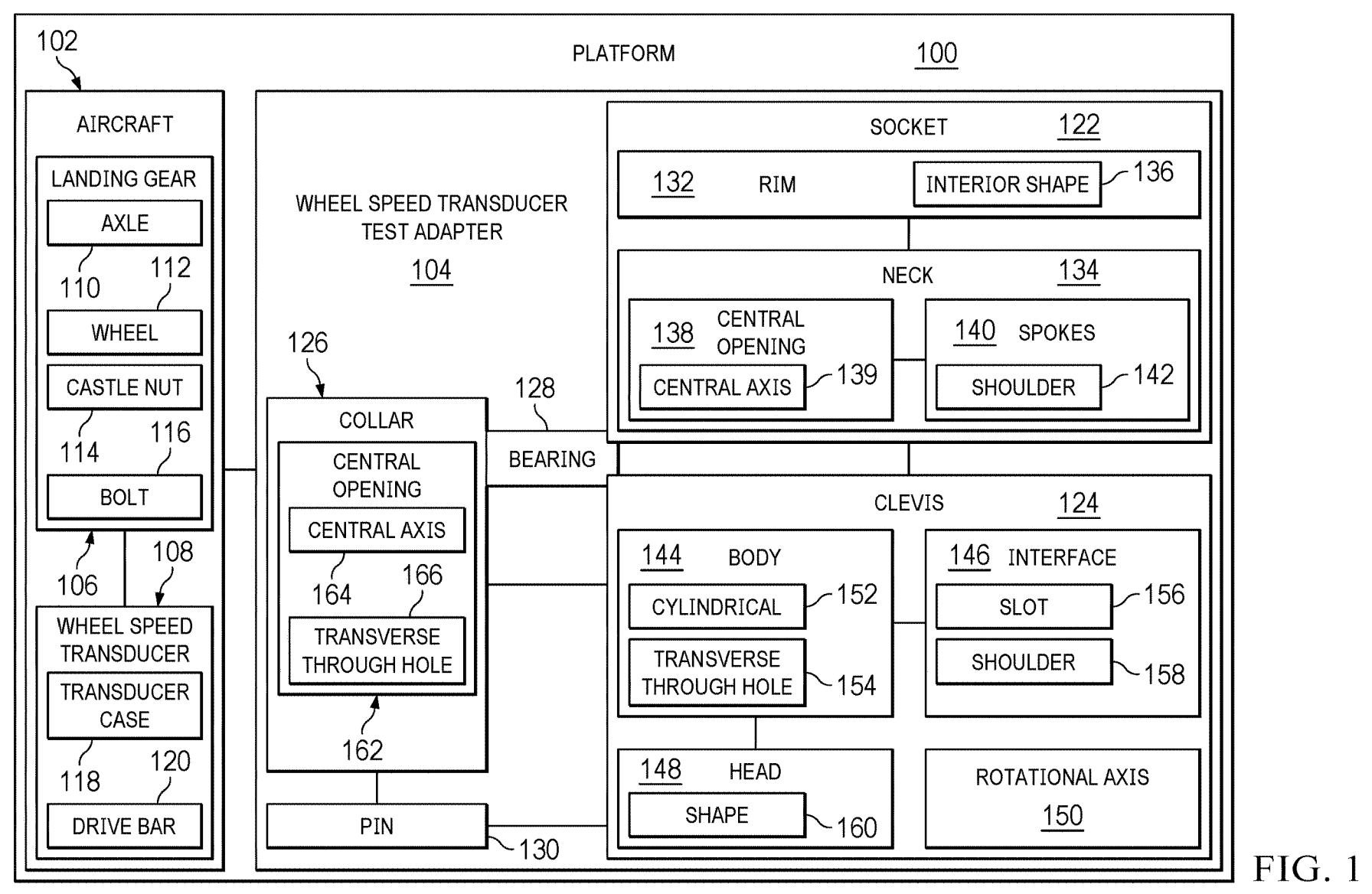

PLATFORM 100

WHEEL SPEED TRANSDUCER TEST ADAPTER 104

SOCKET 122

RIM 132

INTERIOR SHAPE 136

NECK 134

CENTRAL OPENING 138

CENTRAL AXIS 139

SPOKES 140

SHOULDER 142

CLEVIS 124

BODY 144

CYLINDRICAL 152

TRANSVERSE THROUGH HOLE 154

INTERFACE 146

SLOT 156

SHOULDER 158

HEAD 148

SHAPE 160

ROTATIONAL AXIS 150

BEARING 128

COLLAR 126

CENTRAL OPENING 162

CENTRAL AXIS 164

TRANSVERSE THROUGH HOLE 166

PIN 130

AIRCRAFT 102

LANDING GEAR 106

AXLE 110

WHEEL 112

CASTLE NUT 114

BOLT 116

WHEEL SPEED TRANSDUCER 108

TRANSDUCER CASE 118

DRIVE BAR 120

FIG. 1

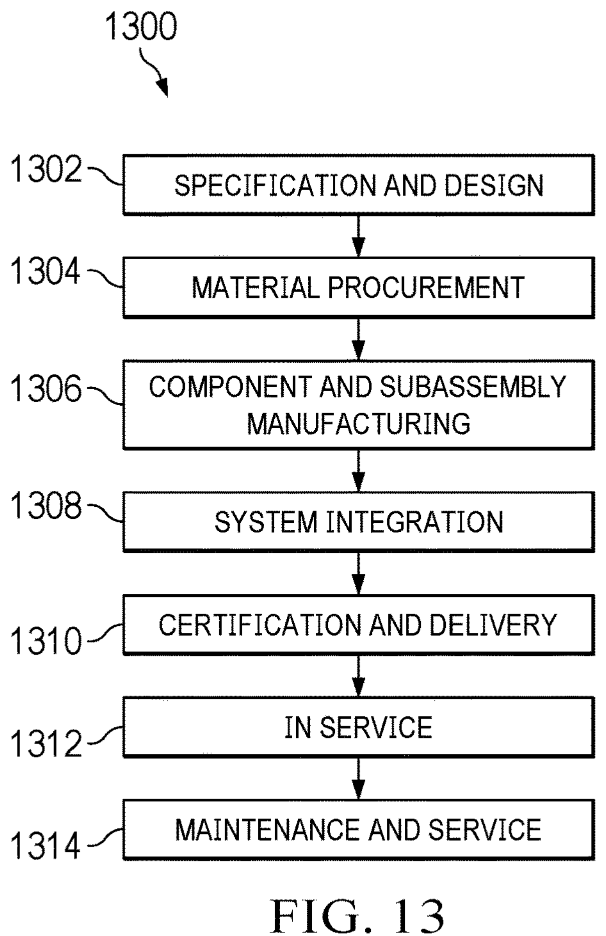
FIG. 13
1400
AIRCRAFT
1402 AIRFRAME
INTERIOR 1406
SYSTEMS
PROPULSION SYSTEM
ELECTRICAL SYSTEM
1408 1412 1410 1414
HYDRAULIC SYSTEM
ENVIRONMENTAL SYSTEM
1404
FIG. 14

WHEEL SPEED TRANSDUCER TEST ADAPTER

GOVERNMENT LICENSING RIGHTS

This invention was made with Government support under Contract Number N00019-18-C-1012, awarded by the Department of Defense. The government has certain rights to this invention.

BACKGROUND INFORMATION

1. Field

The present disclosure relates generally to wheel speed transducer maintenance. More specifically, the present disclosure relates to testing a wheel speed transducer while the transducer is mounted to a wheel after maintenance activities require replacement or removal of the transducer.

2. Background

Today's aircraft are typically equipped with at least one wheel speed transducer which is responsible for measuring the ground speed of the aircraft and for providing antiskid control. Most of the elements of a wheel speed transducer are fixed within each main landing gear axle, however an outer portion is attached to the main landing gear wheel hub. As an aircraft moves on the ground, the outer portion of the wheel speed transducer rotates with the wheel to measure the revolutions per minute (RPM) of each wheel independently and reports these values back to the vehicle management system. A functional checkout of the wheel speed transducer is required after any maintenance activities involving the removal/replacement of the wheel speed transducer. Functional checkout of the wheel speed transducer requires the wheel speed transducer to be manually spun at increasing speed intervals in both the forward and aft directions to verify proper installation. Currently, in order to manually spin the wheel speed transducer, the aircraft is lifted so that the wheel and tire is off the ground and an operator manually spins the wheel and tire to effect rotation of the wheel speed transducer. Not only is additional equipment required to lift the aircraft, or at least the aircraft wheel, off the ground, an operator spinning the wheel and tire by hand is inexact and could possibly lead to reading errors.

Therefore, it would be desirable to have a method and apparatus that takes into account at least some of the issues discussed above, as well as other possible issues.

SUMMARY

An illustrative embodiment of the present disclosure provides a wheel speed transducer testing apparatus which comprises a socket, a clevis, and a collar. The clevis is rotatable within the socket about an axis common to both the clevis and the socket. The collar is secured to the clevis. Another illustrative embodiment of the present disclosure provides a system for testing an aircraft wheel speed transducer. A wheel speed transducer is mounted to an aircraft wheel. A socket is shaped to engage the aircraft wheel. A clevis is rotatable within the socket and shaped to engage the wheel speed transducer. A collar is secured to the clevis and torque applied to the clevis causes the clevis and the wheel speed transducer to rotate with respect to the socket.

A further illustrative embodiment of the present disclosure provides a method for wheel speed transducer testing. A wheel speed transducer that is mounted to a wheel is exposed. A clevis is positioned within a socket where the clevis is rotatable within the socket about an axis common to both the clevis and the socket. The socket engages the wheel. The clevis engages the wheel speed transducer. Torque is applied to the clevis rotating the clevis and transmitting rotational movement to the wheel speed transducer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is an illustration of a block diagram of a platform in accordance with an illustrative embodiment;

FIG. 13 is an illustration of a block diagram of an aircraft manufacturing and service method in accordance with an illustrative embodiment; and FIG. 14 is an illustration of a block diagram of an aircraft in which an illustrative embodiment may be implemented.

DETAILED DESCRIPTION

Figure 2:
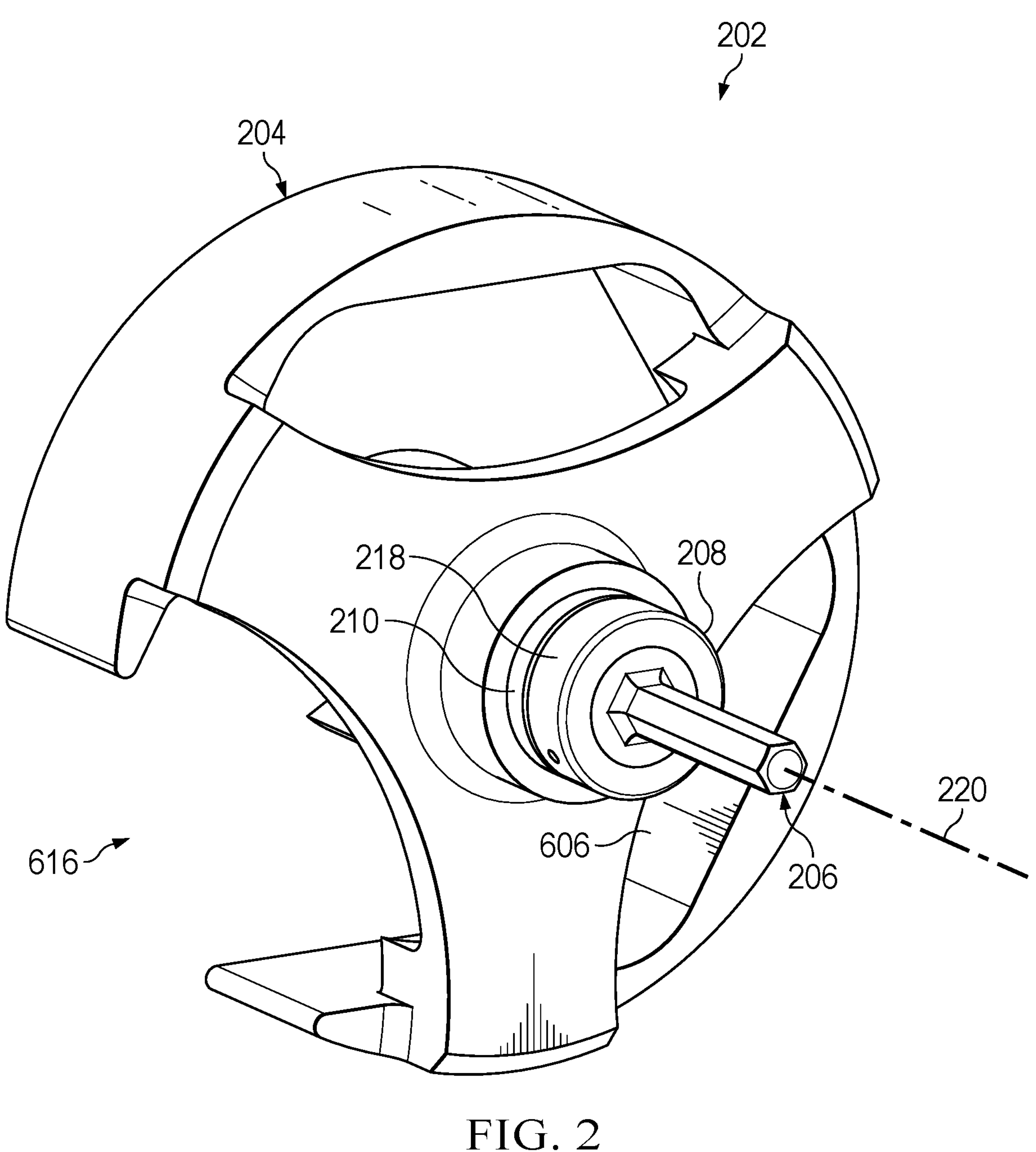
FIG. 2 is an illustration of a perspective view of a wheel speed transducer test adapter in accordance with an illustrative embodiment.
Figure 3:
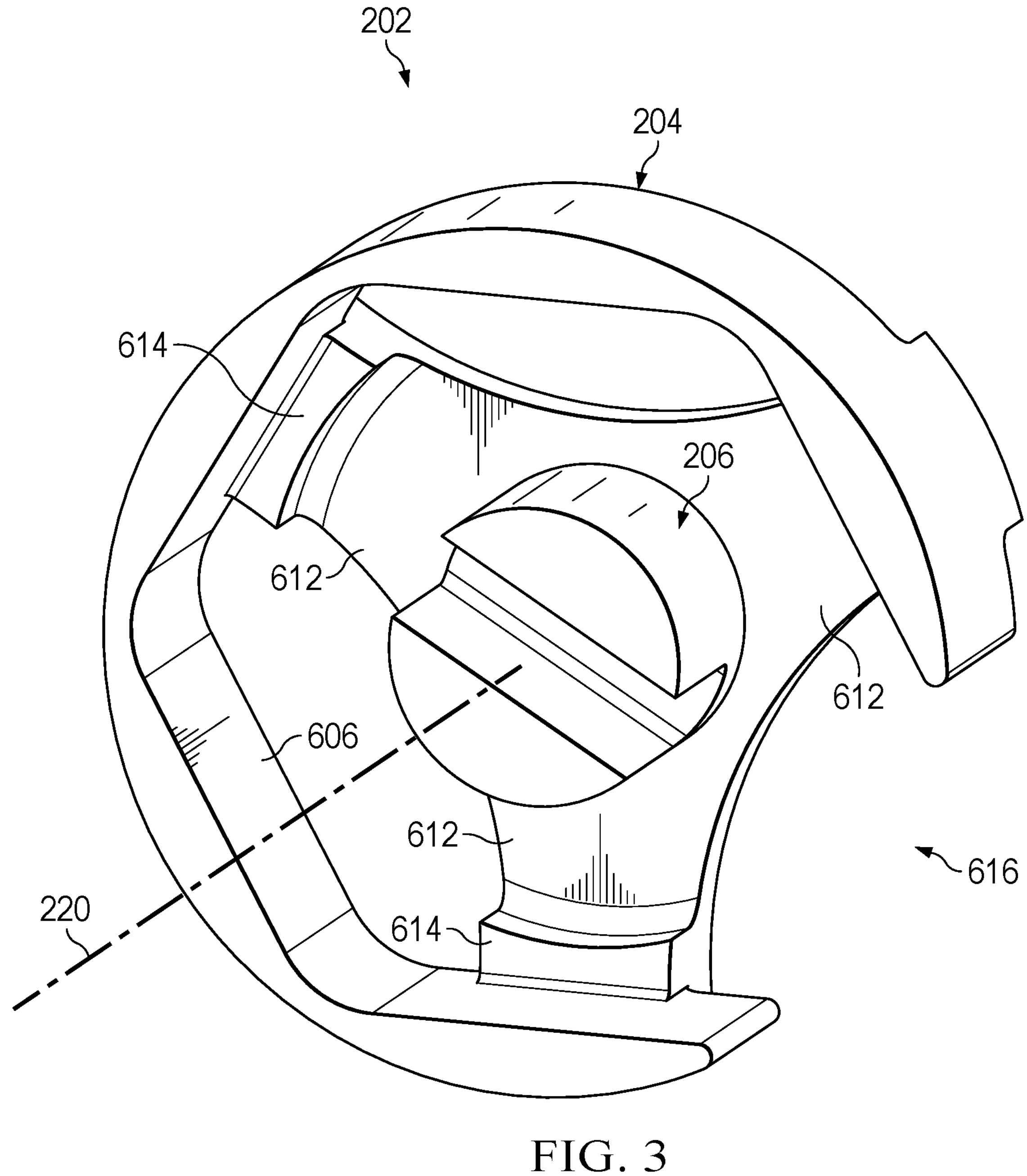
FIG. 3 is an illustration of a perspective view of a wheel speed transducer test adapter in accordance with an illustrative embodiment.
Figure 4:
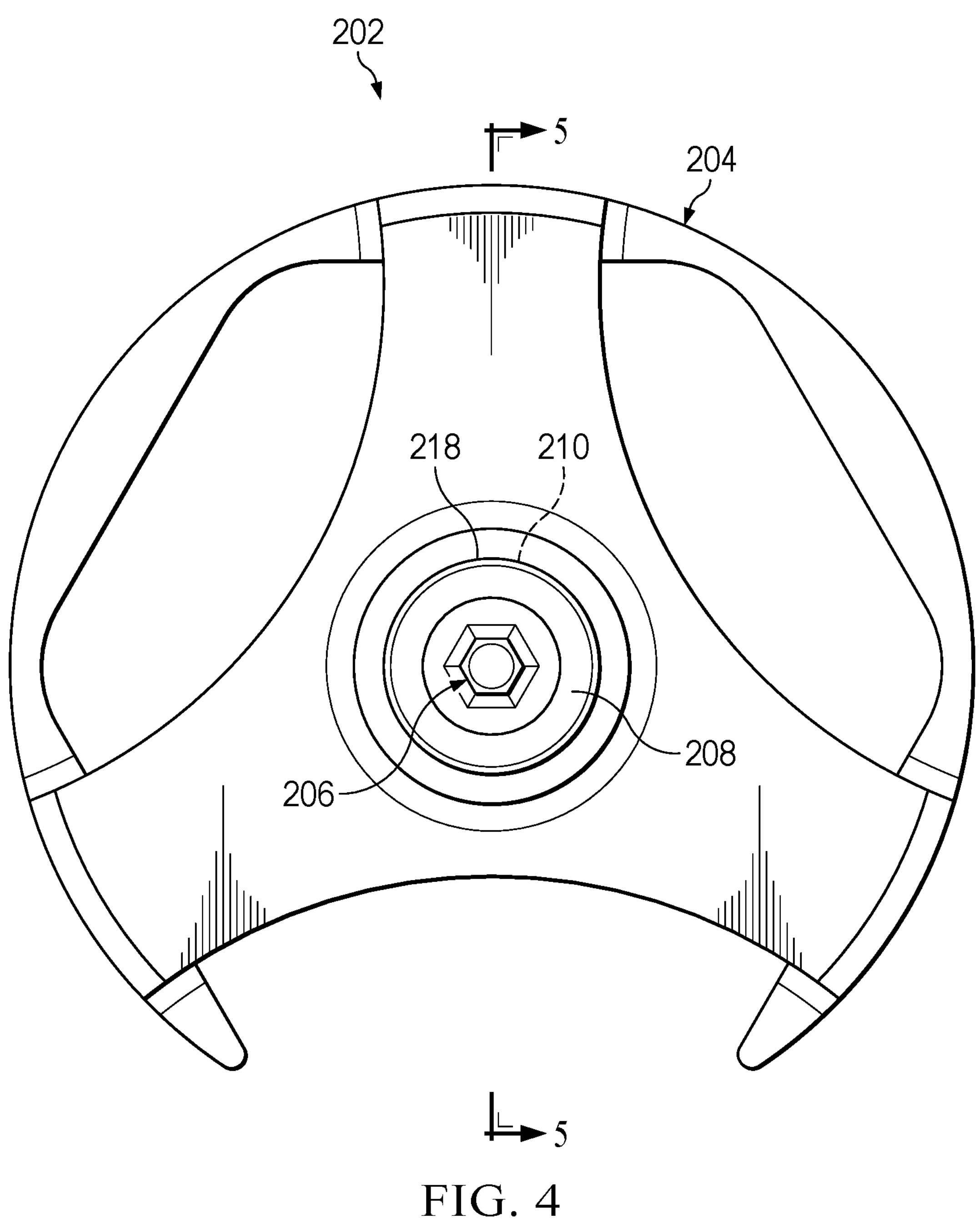
FIG. 4 is an illustration of an end view of a wheel speed transducer test adapter in accordance with an illustrative embodiment.
Figure 5:
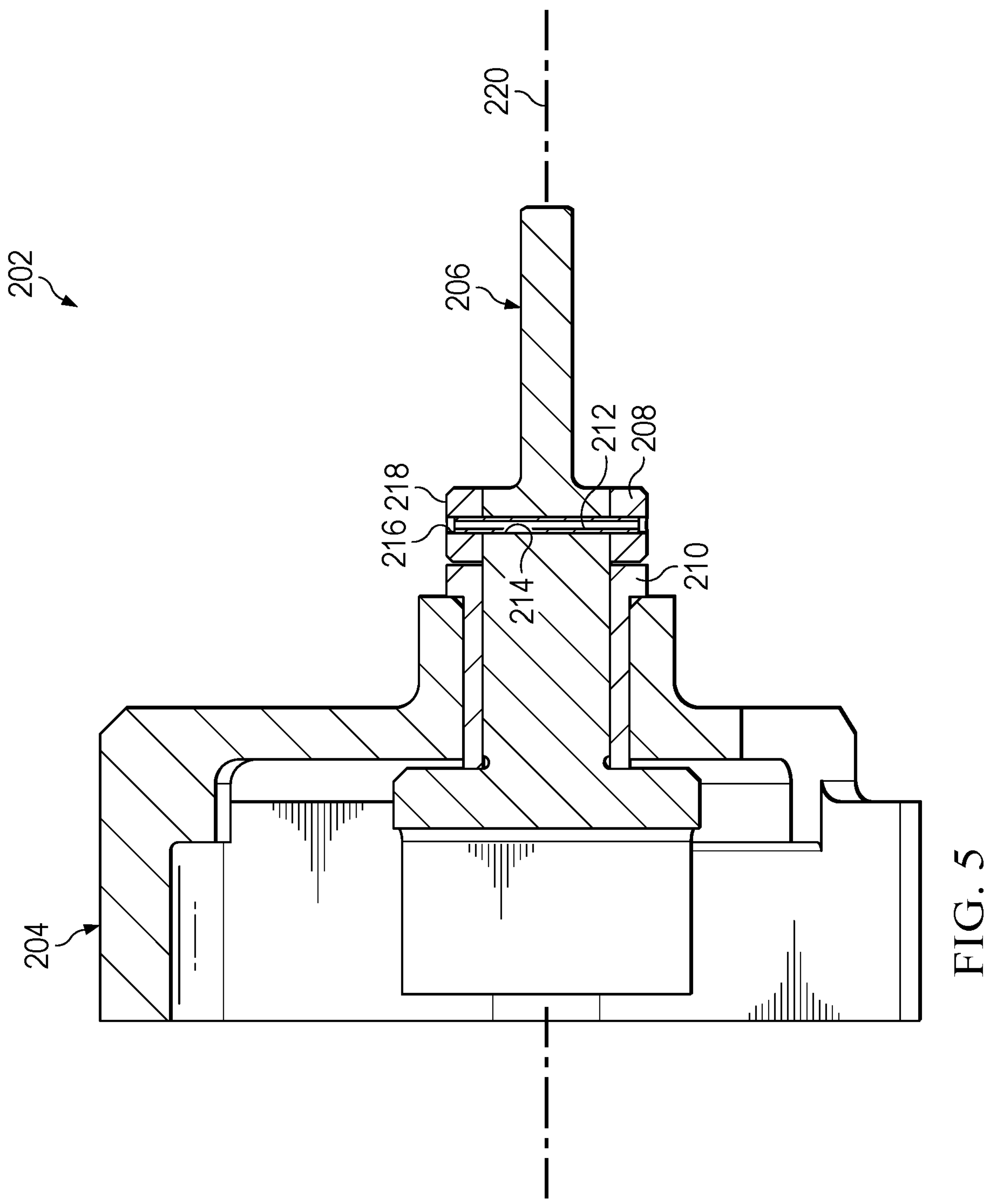
FIG. 5 is an illustration of a sectional view along line 5-5 of FIG. 4 of a wheel speed transducer test adapter in accordance with an illustrative embodiment.

The illustrative embodiments recognize and take into account one or more different considerations. For example, the illustrative embodiments recognize and take into account that testing of wheel speed transducers is required after any maintenance activities involving removal or replacement of a wheel speed transducer.

The illustrative embodiments also recognize and take into account that current testing procedures of wheel speed transducers may involve lifting a wheel or an aircraft off the ground and manually spinning the wheel to test the wheel speed transducer.

The illustrative embodiments also recognize and take into account that lifting the wheel or aircraft involves extra equipment and requires extra safety considerations. The illustrative embodiments also recognize and take into account that manually spinning a tire/wheel is inconsistent and may provide inaccurate testing results.

Thus, the illustrative embodiments provide a wheel speed transducer test adapter that provides a stable and aligned engagement with a wheel speed transducer while the wheel and aircraft are resting on the ground. The wheel speed transducer test adapter easily engages with a standard impact wrench or other torque supplying device to allow for consistent and measured rotation of the wheel speed transducer to capture accurate testing results.

With reference now to the figures and, in particular, with reference to FIG. 1, an illustration of a block diagram of a platform is depicted in accordance with an illustrative embodiment. Platform 100 has aircraft 102 and wheel speed transducer test adapter 104 in this illustrative example.

Platform 100 may take a variety of different forms. For example, without limitation, platform 100 may be implemented in a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where testing of a wheel speed transducer is desirable.

In this illustrative example, platform 100 takes the form of aircraft 102. In this illustrative example, when platform 100 takes the form of aircraft 102, aircraft 102 includes landing gear 106 and wheel speed transducer 108.

In this illustrative example, landing gear 106 includes axle 110 connected to wheel 112 by castle nut 114. Landing gear includes at least one wheel 112 and at least one axle 110. Landing gear 106 may include a set of wheels 112 associated with a set of axles 110.

As used herein, a "set of," when used with reference to items, means one or more items. For example, a "set of wheels" is one or more of wheels 112.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Transducer case 118 of wheel speed transducer 108 is connected to axle 110. Bolt 116 connects axle 110 to transducer case 118 of wheel speed transducer 108. Wheel speed transducer 108 includes drive bar 120. Drive bar 120 rotates with respect to transducer case 118 to measure and collect wheel speed data.

If landing gear 106 includes a set of wheels and or a set of axles, each wheel 112 may include a corresponding wheel speed transducer.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example, wheel speed transducer test adapter 104 includes socket 122, clevis 124, collar 126, and bearing 128. Collar 126 is connected to clevis 124 and secures clevis 124 within socket 122. Pin 130 seated within collar 126 and clevis 124 connects collar 126 to clevis 124. Clevis 124 is rotatable within socket 122. Bearing 128 positioned between clevis 124 and socket 122 ensures smooth rotation of clevis 124 with respect to socket 122. Bearing 128 positioned between collar 126 and socket 122 ensures smooth rotation of collar 126 with respect to socket 122.

In this illustrative example, socket 122 includes rim 132 and neck 134. In this illustrative example, socket 122 is generally circular shaped. Rim 132 has a generally circular outside perimeter shape and surrounds neck 134. Rim 132 includes interior shape 136. Interior shape 136 is sized and shaped to engage an outside surface of castle nut 114. Interior shape 136 may be described as a ratchet or socket type shape which includes a series of slanted surfaces designed to engage and grip castle nut 114.

Neck 134 acts a hub for socket 122. Neck 134 includes central opening 138. Central opening 138 defines central axis 139. Central opening 138 is sized to rotationally engage clevis 124. Socket 122 includes spokes 140 extending from neck 134 out towards and connecting to rim 132. Neck 134 includes at least two spokes 140 but may include more. Each spoke of spokes 140 include shoulder 142. Shoulder 142 is positioned adjacent rim 132. Shoulder 142 is sized and shaped to engage a facing surface of castle nut 114. The entirety of socket 122 may be integrally formed for example, by weld, casting, or billet machining or the individual components of socket 122 may be mechanically fastened together.

In this illustrative example, clevis 124 includes body 144 connected to interface 146 and head 148. The entirety of clevis 124 may be integrally formed for example, by weld, casting, or billet machining or the individual components of clevis 124 may be mechanically fastened together. Clevis 124 has rotational axis 150. Rotational axis 150 is axially aligned and co-linear with central axis 139 of socket 122. In other words, rotational axis 150 and central axis 139 are the same axis.

Body 144 is cylindrical 152 in shape. Body 144 is sized and shaped to rotationally engage central opening 138 of socket 122. Body 144 includes transverse through-hole 154. Transverse through-hole 154 is perpendicular to rotational axis 150. Transverse through-hole 154 is sized and shaped to accept pin 130.

Interface 146 is connected to or integrally formed with body 144. Interface 146 includes slot 156 sized and shaped to engage drive bar 120. Interface 146 includes shoulder 158. Shoulder 158 is sized and shaped to prevent interface 146 from passing through central opening 138 of neck 134.

Head 148 is connected to or integrally formed with body 144. Head 148 extends from body 144 opposite of interface 146. Head 148 has shape 160. Shape 160 is sized and shaped to engage a torque supplying device such as an impact wrench. Shape 160 can have a cross-section comprising a polygonal shape. Shape 160 securely engages a torque supplying device which allows the rotational movement provided by the torque supplying device to be transmitted to clevis 124.

Collar 126 is connected to clevis 124 with pin 130. Collar 126 has central opening 162. Central opening 162 is sized and shaped to accept body 144 of clevis 124. Central opening 162 has central axis 164. Central axis 164 is axially aligned and co-linear with central axis 139 of socket 122 and rotational axis 150 of clevis 124. In other words, central axis 164, central axis 139, and rotational axis 150 are the same axis. Collar 126 includes transverse through-hole 166. Transverse through-hole 166 is perpendicular to central axis 164. Transverse through-hole 166 is sized and shaped to accept pin 130. Transverse through-hole 166 is sized and shaped such that pin 130 is sub flush with respect to an outer surface of collar 126. In other words, the ends of pin 130 do not extend past the outer surface of collar 126. The ends of pin 130 are sunk or reset within the outer surface of collar 126.

Bearing 128 is positioned between clevis 124 and socket 122. Specifically, bearing 128 allows smooth rotational engagement between body 144 of clevis 124 and central opening 138 of socket 122. Bearing 128 is positioned between collar 126 and socket 122. Specifically, bearing 128 allows smooth rotational engagement between collar 126 and neck 134 of socket 122. Bearing 128 may comprise any functional design common in the art and may comprise one or more bearings.

With reference next to FIGS. 2-5, illustrations of a wheel speed transducer test adapter are depicted in accordance with an illustrative embodiment. In this illustrative example and the illustrative examples that follow, the same reference numeral may be used in more than one figure. This reuse of a reference numeral in different figures represents the same element in the different figures. The components illustrated in FIGS. 2-5 are examples of physical implementations of socket 122, clevis 124, collar 126, and bearing 128 shown in block form in FIG. 1.

As illustrated, wheel speed transducer test adapter 202 includes socket 204, clevis 206, collar 208, and bearing 210. Collar 208 is connected to clevis 206 and secures clevis 206 within socket 204. Pin 212 seated within collar 208 and clevis 206 connects collar 208 to clevis 206. Pin 212 is seated within transverse through-hole 214 of clevis 206 as well as transverse through-hole 216 of collar 208. Transverse through-hole 214 and transverse through-hole 216 are necessarily colinear. Transverse through-hole 216 is sized and shaped, i.e. has a length, such that pin is sub flush with respect to outer surface 218 of collar 208. In other words, the ends of pin 212 do not extend past outer surface 218 of collar 208. The ends of pin 212 are countersunk below outer surface 218 of collar 208.

Clevis 206 is rotatable within socket 204 about axis 220 common to both clevis 206 and socket 204. Bearing 210 is positioned between clevis 206 and socket 204 and ensures smooth rotation of clevis 206 with respect to socket 204. Bearing 210 positioned between collar 208 and socket 204 ensures smooth rotation of collar 208 with respect to socket 204.

Figure 6:
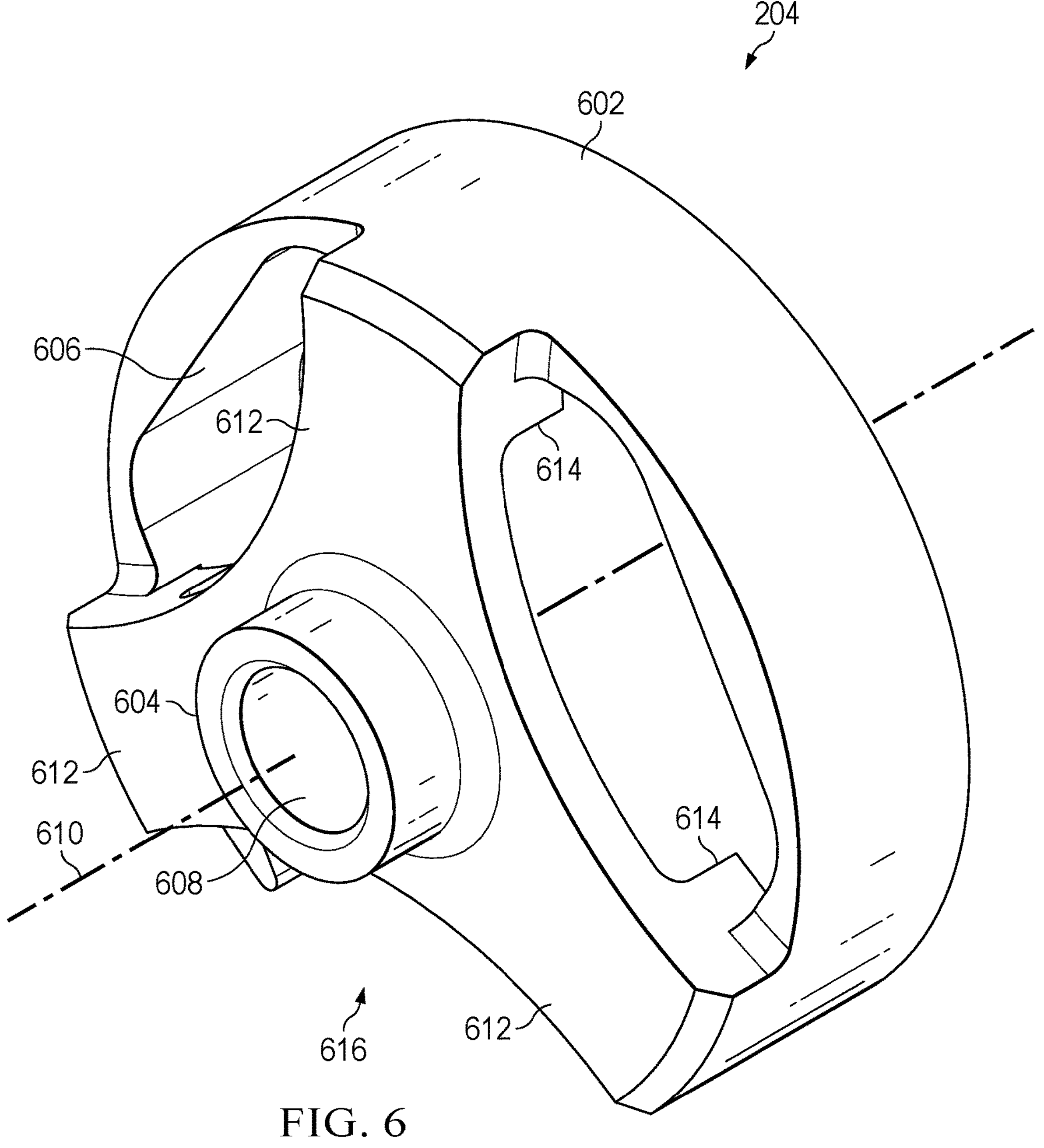
FIG. 6 is an illustration of a perspective view of a socket of a wheel speed transducer test adapter in accordance with an illustrative embodiment.

With reference next to FIG. 6 an illustration of a socket is depicted in accordance with an illustrative embodiment. As illustrated, socket 204 includes rim 602 and neck 604.

Socket 204 is generally circular shaped. Rim 602 has a generally circular outside perimeter shape and surrounds neck 604. Rim 602 includes interior shape 606 (best illustrated in FIGS. 2-3). Interior shape 606 is sized and shaped to engage an outside surface of a castle nut used to attach a wheel to an axle. Interior shape 606 may be described as a socket type shape which includes a series of slanted surfaces designed to grip the castle nut. Rim 602 includes cut out 616. Cut out 616 interrupts the perimeter of rim 602. Rim 602 is generally circular in shape except for cut out 616.

Neck 604 is a hub for socket 204. Neck 604 includes central opening 608. Central opening 608 defines central axis 610. Central opening 608 is sized to rotationally support clevis 206. Socket 204 includes spokes 612 extending from neck 604 out towards and connecting to rim 602. In this illustrative example, socket 204 includes three spokes 612 spaced evenly around neck 604. At least two spokes 612 should be present to evenly spread the load of socket 204, but socket 204 may include more than two spokes. Each spoke 612 include shoulder 614. Shoulder 614 is positioned adjacent rim 602. Shoulder 614 is sized and shaped to engage a facing surface of a castle nut. The entirety of socket 204 may be integrally formed or the individual components of socket 204 may be mechanically fastened together.

Figure 7:
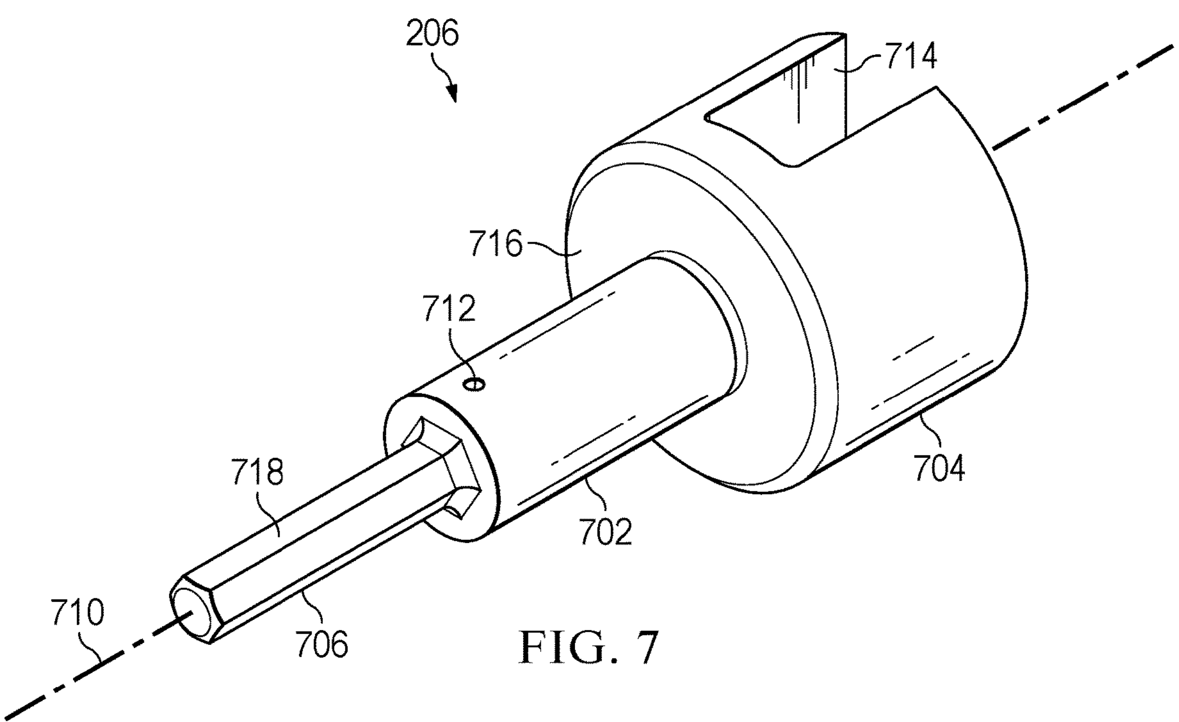
FIG. 7 is an illustration of a perspective view of a clevis of a wheel speed transducer test adapter in accordance with an illustrative embodiment.
Figure 8:
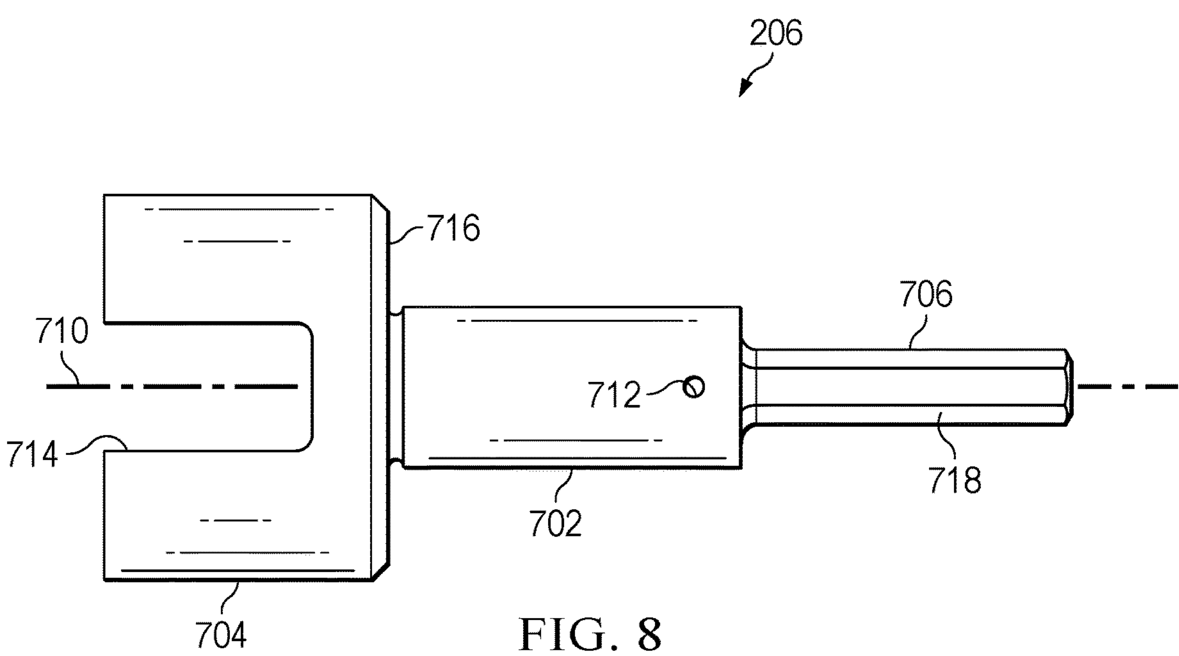
FIG. 8 is an illustration of a side view of a clevis of a wheel speed transducer test adapter in accordance with an illustrative embodiment.

With reference next to FIG. 7 and FIG. 8, illustrations of a clevis are depicted in accordance with an illustrative embodiment. As illustrated, clevis 206 includes body 702, interface 704, and head 706.

In this illustrative example, clevis 206 includes body 702 connected to interface 704 and head 706. The entirety of clevis 206 may be integrally formed or the individual components of clevis 206 may be mechanically fastened together. Clevis 206 has rotational axis 710. Rotational axis 710 is axially aligned and co-linear with central axis 610 of socket 204. In other words, rotational axis 710 and central axis 610 are the same axis depicted as axis 220 of FIGS. 2, 3, and 5.

Body 702 is cylindrical and sized to rotationally engage central opening 608 of socket 204. Body 702 includes transverse through-hole 712. Transverse through-hole 712 is perpendicular to rotational axis 710. Transverse through-hole 712 is sized and shaped to accept pin 212.

Interface 704 is connected to or integrally formed with body 702. Interface 704 includes slot 714 sized and shaped to engage a drive bar of a wheel speed transducer. Interface 704 includes shoulder 716. Shoulder 716 is sized and shaped to prevent interface 704 from passing through central opening 608 of neck 604.

Head 706 is connected to or integrally formed with body 702. Head 706 extends from body 702 on an opposite end of body 702 than interface 704. Head 706 has shape 718. Shape 718 is sized and shaped to engage a torque supplying device such as an impact wrench. Shape 718 may have a polygonal cross-section. Shape 718 ensures a secure, non-slip engagement with a torque supplying device which allows the rotational movement provided by the torque supplying device to be transmitted to clevis 206.

Figure 9:
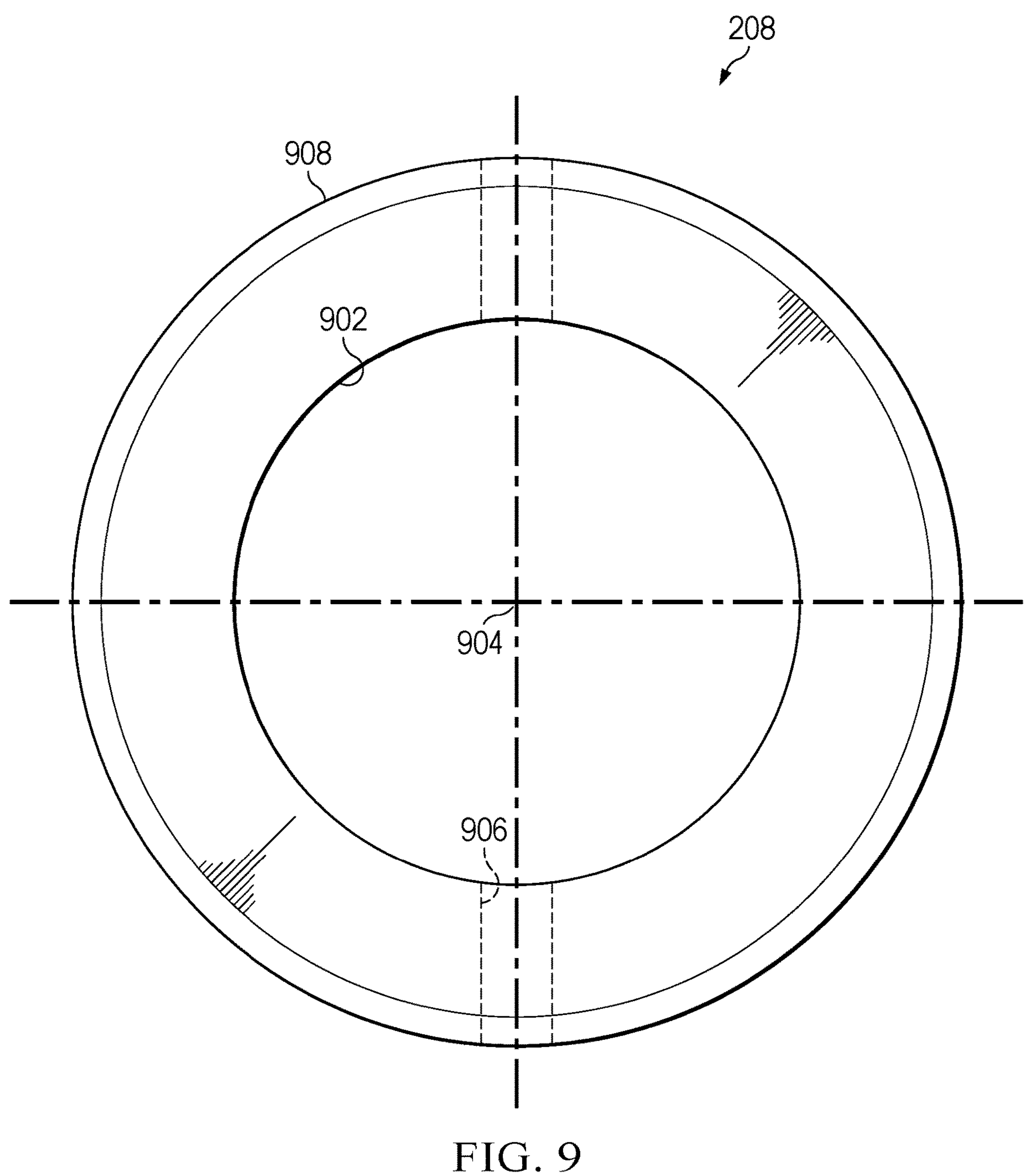
FIG. 9 is an illustration of an end view of a collar of a wheel speed transducer test adapter in accordance with an illustrative embodiment.

With reference next to FIG. 9 an illustration of a collar is depicted in accordance with an illustrative embodiment. As illustrated, collar 208 includes central opening 902 having central axis 904.

Collar 208 is connected to body 702 of clevis 206 with pin 212. Collar 208 has central opening 902. Central opening 902 is sized and shaped to accept body 702 of clevis 206. Central opening 902 has central axis 904. Central axis 904 is axially aligned and co-linear with central axis 610 of socket 204 and rotational axis 710 of clevis 206. Central axis 904, central axis 610, and rotational axis 710 are the same axis. Collar 208 includes transverse through-hole 906. Transverse through-hole 906 is perpendicular to central axis 904. Transverse through-hole 906 is sized and shaped to accept pin 212. Transverse through-hole 906 is sized and shaped such that pin 212 is sub flush with respect to outer surface 908 of collar 208. The ends of pin 212 do not extend past outer surface 908. The ends of pin 212 are below outer surface 908 of collar 208.

Figure 10:
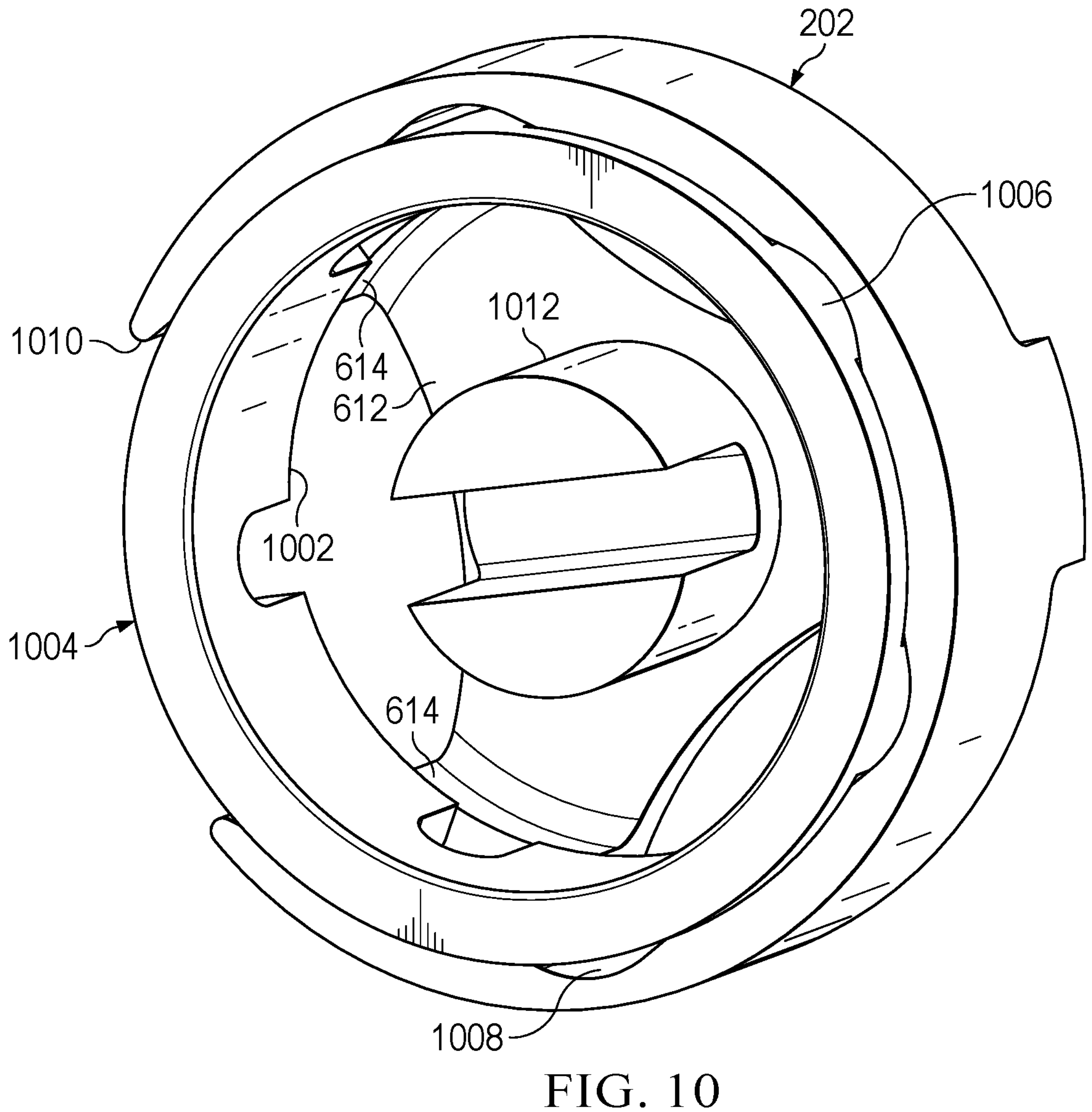
FIG. 10 is an illustration of a perspective view of a wheel speed transducer test adapter mounted to a castle nut in accordance with an illustrative embodiment.
Figure 11:
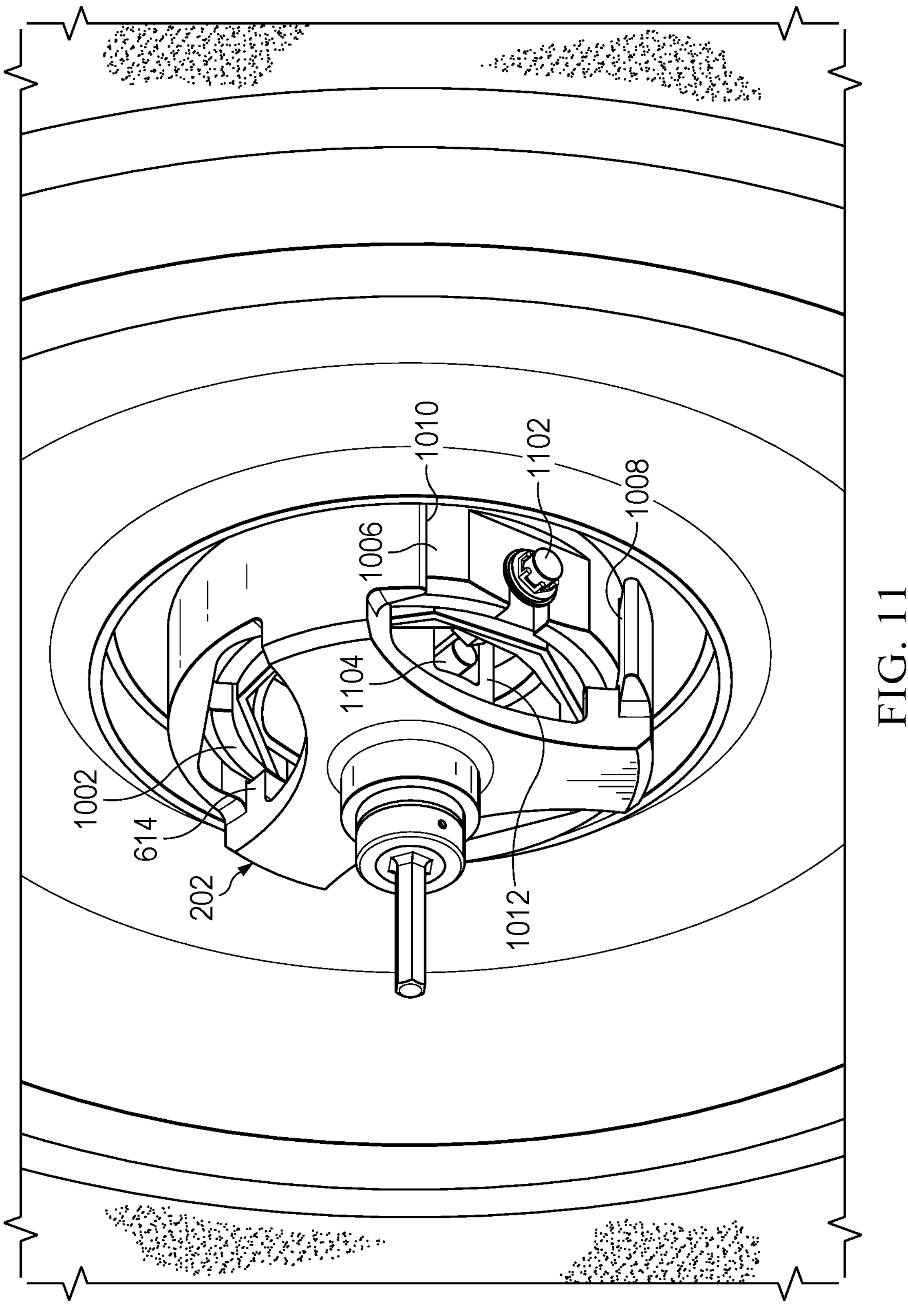
FIG. 11 is an illustration of a perspective view of a wheel speed transducer test adapter mounted to a wheel and wheel speed transducer in accordance with an illustrative embodiment.

With reference next to FIG. 10 and FIG. 11, illustrations of wheel speed transducer test adapter 202 mounted to or engaged with castle nut 1004 are depicted in accordance with an illustrative embodiment.

Shoulders 614 of spokes 612 abut face 1002 of castle nut 1004. Face 1002 is an outboard facing surface. Additionally, interior shape 1008 of the rim of the socket of wheel speed transducer test adapter 202 engages outer surface 1006 of castle nut 1004. Interior shape 1008 includes slanted surfaces that match the shape of outer surface 1006 in the same manner that a wrench engages a nut. Cut out 1010 in the rim of the socket of wheel speed transducer test adapter 202 accommodates bolt 1102. Bolt 1102 connects the axle to the transducer case of the wheel speed transducer. The wheel speed transducer includes drive bar 1104. Interface 1012 of wheel speed transducer test adapter engages drive bar 1104.

As clevis 206 rotates with respect to socket 204, interface 1012 is engaged with drive bar 1104 and interface 1012 causes drive bar 1104 to rotate with respect to castle nut 1004. Rotation of clevis 206 is provided by a torque supplying device attached to clevis 206 where rotation is consistent and at a predetermined revolution per minute.

Figure 12:
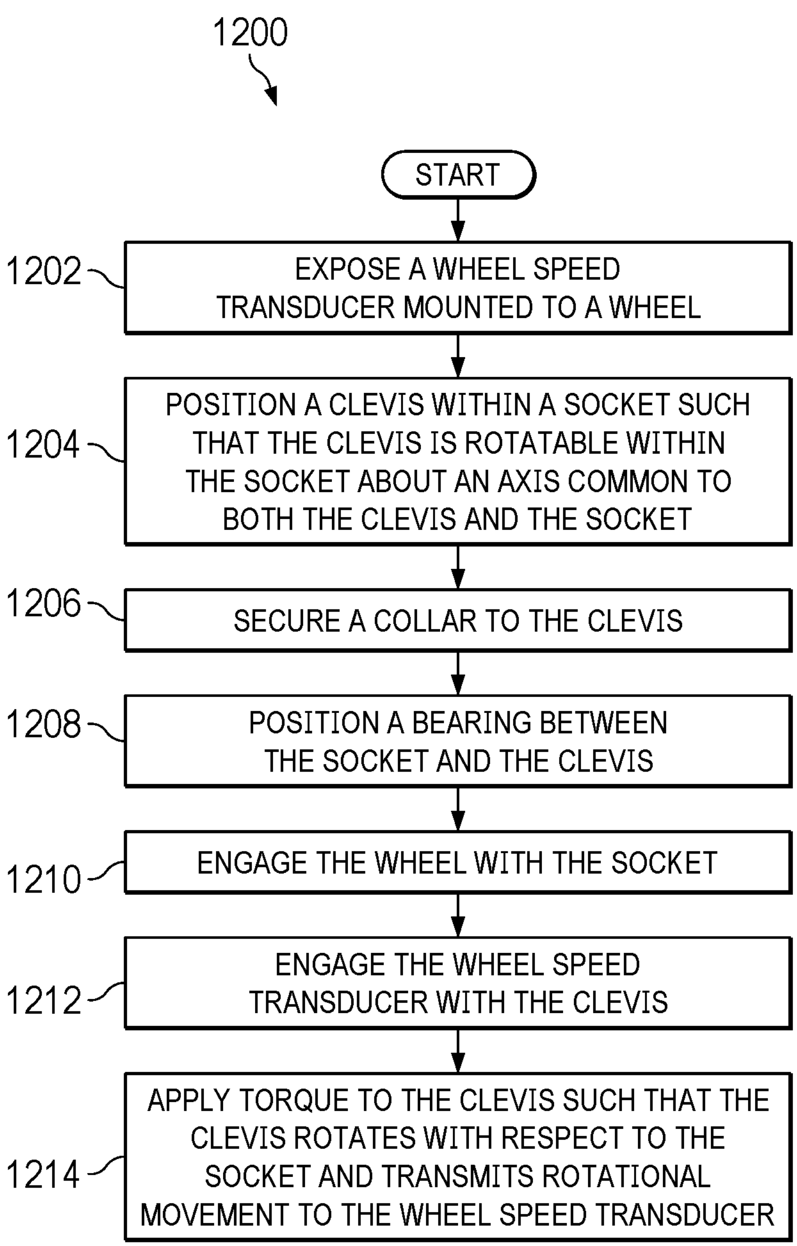
FIG. 12 of a flowchart of a process for wheel speed transducer testing in accordance with an illustrative embodiment.

With reference next to FIG. 12, an illustration of a flowchart of a process 1200 for wheel speed transducer testing is depicted in accordance with an illustrative embodiment. The method depicted in FIG. 12 may be used in conjunction with the wheel speed transducer test adapter depicted in FIGS. 1-11.

The process begins by exposing a wheel speed transducer mounted to a wheel (operation 1202). This may involve removing a wheel hubcap. The process positions a clevis within a socket (operation 1204). The clevis is rotatable within the socket about a common axis to both the clevis and the socket. At operation 1206, the process secures a collar to the clevis. At operation 1208, the process positions a bearing between the socket and the clevis. The bearing may also be positioned between the collar and the socket. At operation 1210, the process engages the wheel with the socket. At operation 1212, the process engages the wheel speed transducer with the clevis. At operation 1214, torque is applied to the clevis to rotate the clevis with respect to the socket and the wheel the socket is engaged with. The clevis transmits the rotational movement to the wheel speed transducer. As a result, the drive bar of the wheel speed transducer rotates with respect to the transducer case.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The illustrative embodiments of the disclosure may be further described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance, service, or inspection.

The apparatus of this disclosure may be installed on an aircraft during component and subassembly manufacturing 1306. In addition, the apparatus of this disclosure may be retrofitted onto aircraft 1400 in FIG. 14 during routine maintenance and service 1314 as part of a modification, reconfiguration, or refurbishment of aircraft 1400 in FIG. 14.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314, inclusive of inspection, in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A wheel speed transducer test adapter, comprising:
- a socket;
- a rotatable structure that is rotatable within the socket about an axis common to both the rotatable structure and the socket, wherein the rotatable structure comprises:
  - a cylindrical body;
  - an interface connected to the cylindrical body, the interface for engagement with a wheel speed transducer; and
  - a head extending from the cylindrical body opposite the interface; and
- a collar secured to the rotatable structure.

2. The wheel speed transducer test adapter of claim 1, wherein the head is shaped for engagement with a torque supplying device.

3. The wheel speed transducer test adapter of claim 1, wherein the head is shaped to engage a torque supplying device and transmit rotational movement delivered by the torque supplying device to the rotatable structure about the axis common to both the rotatable structure and the socket.

4. The wheel speed transducer test adapter of claim 1, wherein the socket comprises:
- a rim shaped to engage a wheel having a wheel speed transducer;
- a central opening surrounded by the rim and having a central axis that is the axis common to both the rotatable structure and the socket; and
- a cut out of a perimeter of the rim.

5. The wheel speed transducer test adapter of claim 1, further comprising a pin seated within the collar and the rotatable structure.

6. The wheel speed transducer test adapter of claim 5, wherein the pin is sub flush with respect to the collar.

7. The wheel speed transducer test adapter of claim 1, further comprising a bearing positioned between the socket and the rotatable structure and configured to allow rotation of the rotatable structure with respect to the socket.

8. The wheel speed transducer test adapter of claim 7, wherein the bearing is positioned between the collar and the socket and is configured to allow rotation of the collar with respect to the socket.

9. The wheel speed transducer test adapter of claim 1, wherein:
- the socket comprises:
  - a rim shaped to engage a wheel having a wheel speed transducer, the rim connected to a neck, the neck comprising a central opening axially aligned with the rim; and
- the rotatable structure comprises:
  - an interface for engagement with the wheel speed transducer, the interface comprising a shoulder for preventing the interface from passing through the central opening of the neck;
  - a body connected to the interface, wherein the body is sized for rotational movement within the central opening of the neck; and
  - a head extending from the body opposite the interface.

10. A system for testing an aircraft wheel speed transducer, comprising:
- a wheel speed transducer mounted to an aircraft wheel;
- a socket shaped to engage the aircraft wheel;
- a rotatable structure that is rotatable within the socket and shaped to engage the wheel speed transducer, wherein the rotatable structure comprises:
  - a cylindrical body;
  - an interface connected to the cylindrical body, the interface for engagement with the wheel speed transducer; and
  - a head extending from the cylindrical body opposite the interface; and
- a collar secured to the rotatable structure;
- wherein torque applied to the rotatable structure causes the rotatable structure and the wheel speed transducer to rotate with respect to the socket.

11. The system of claim 10, wherein the rotatable structure comprises:
- an interface for engagement with the wheel speed transducer, wherein the interface includes a shoulder that abuts the socket;
- a cylindrical body connected to the interface; and
- a head extending from the cylindrical body opposite the interface, the head shaped for engagement with a torque supplying device.

12. The system of claim 10, wherein the rotatable structure rotates about an axis common to both the rotatable structure and the socket.

13. The system of claim 10, wherein the socket comprises:
- a rim shaped to engage the aircraft wheel;
- a central opening surrounded by the rim and axially aligned with the rotatable structure; and
- a cut out of a perimeter of the rim.

14. The system of claim 10 further comprising a pin seated within the collar and the rotatable structure, the pin configured to secure the rotatable structure to the socket, wherein the pin is sub flush with respect to the collar.

15. The system of claim 10, further comprising a bearing positioned between the socket and the rotatable structure and configured to allow rotation of the rotatable structure with respect to the socket.

16. The system of claim 15, wherein the bearing is positioned between the collar and the socket and is configured to allow rotation of the collar with respect to the socket.

17. A method for wheel speed transducer testing, the method comprising:

exposing a wheel speed transducer mounted to a wheel;

positioning a rotatable structure within a socket such that the rotatable structure is rotatable within the socket about an axis common to both the rotatable structure and the socket;

engaging the wheel with the socket;

engaging the wheel speed transducer with the rotatable structure; and applying torque to the rotatable structure such that the rotatable structure rotates with respect to the socket and transmits rotational movement to the wheel speed transducer.

18. The method of claim 17 further comprising securing a collar to the rotatable structure.

19. The method of claim 17 further comprising positioning a bearing between the socket and the rotatable structure, the bearing configured to allow rotation of the rotatable structure with respect to the socket.

20. The method of claim 17, wherein applying the torque comprises applying the torque at predetermined and consistent rpm.

* * * * *